(12) United States Patent
Madeo et al.

(10) Patent No.: US 12,265,523 B2
(45) Date of Patent: Apr. 1, 2025

(54) PROBABILISTIC RELAY FOR EFFICIENT PROPAGATION IN A BLOCKCHAIN NETWORK

(71) Applicant: nChain Licensing AG, Zug (CH)

(72) Inventors: Simone Madeo, London (GB); Patrick Motylinski, London (GB); Giuseppe Destefanis, London (GB); Stephane Vincent, Luxembourg (LU)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/395,618

(22) Filed: Dec. 24, 2023

(65) Prior Publication Data

US 2024/0211466 A1 Jun. 27, 2024

Related U.S. Application Data

(63) Continuation of application No. 17/751,466, filed on May 23, 2022, now Pat. No. 11,886,426, which is a (Continued)

(30) Foreign Application Priority Data

Jun. 30, 2017 (GB) .................................. 1710517
Aug. 21, 2017 (GB) .................................. 1713363

(51) Int. Cl.
*G06F 16/23* (2019.01)
*H04L 9/00* (2022.01)
(Continued)

(52) U.S. Cl.
CPC ........ *G06F 16/2379* (2019.01); *H04L 9/0643* (2013.01); *H04L 9/3093* (2013.01);
(Continued)

(58) Field of Classification Search
CPC . G06F 16/2379; H04L 9/0643; H04L 9/3093; H04L 67/10; H04L 67/104;
(Continued)

(56) References Cited

U.S. PATENT DOCUMENTS 6,487,194 B1 11/2002 Kirkby
7,644,150 B1 1/2010 Nucci et al.
(Continued)

FOREIGN PATENT DOCUMENTS

CN 104994019 A 10/2015
CN 106603633 A 4/2017
(Continued)

OTHER PUBLICATIONS

Al Hamra, "Swarming overlay construction strategies," Proceedings of the 18th International Conference on Computer Communications and Networks (ICCCN) 2009, Aug. 2009, 8 pages.
(Continued)

*Primary Examiner* — Javier O Guzman
(74) *Attorney, Agent, or Firm* — Tarolli, Sundheim, Covell & Tummino LLP

(57) ABSTRACT

A computer-implemented method for a node of a blockchain network comprising receiving or generating data for distribution in the blockchain network, said node having a plurality of interfaces, said data corresponding to an object such as a transaction or a block. The transaction can be a Bitcoin transaction for recordal in a blockchain. The method determines a correlation matrix having correlation coefficients representing the correlation between data processed at each interface of said node. From the correlation matrix a correlation index for each interface is determined. A threshold or indicator is calculated and data or objects such as Bitcoin transactions are relayed from nodes via interfaces according to a set of correlation coefficients of interface receiving the
(Continued)

data. An indicator or threshold can derived from the correlation matrix and data is relayed if the correlation between the receiving interface and the other interface is lower than the indicator.

17 Claims, 4 Drawing Sheets

Related U.S. Application Data continuation of application No. 16/627,727, filed as application No. PCT/IB2018/054667 on Jun. 25, 2018, now Pat. No. 11,341,123.

(51) Int. Cl.
| | |
|---|---|
| *H04L 9/06* | (2006.01) |
| *H04L 9/30* | (2006.01) |
| *H04L 67/10* | (2022.01) |
| *H04L 67/104* | (2022.01) |

(52) U.S. Cl.
CPC ............ *H04L 67/10* (2013.01); *H04L 67/104* (2013.01); *H04L 9/50* (2022.05)

(58) Field of Classification Search
CPC ....... H04L 9/50; H04L 9/3239; H04L 67/107; H04L 67/1055; H04L 2209/56; G06Q 20/065; G06Q 20/223; G06Q 20/02
See application file for complete search history.

(56) References Cited

U.S. PATENT DOCUMENTS

| | | | |
|---|---|---|---|
| 8,352,585 B2 | 1/2013 | Hu et al. | |
| 2004/0233849 A1 | 11/2004 | Cole | |
| 2005/0080858 A1* | 4/2005 | Pessach | ................ H04L 67/104 709/206 |
| 2005/0083848 A1 | 4/2005 | Shao et al. | |
| 2005/0097386 A1 | 5/2005 | Datta et al. | |
| 2005/0144544 A1 | 6/2005 | Gariador et al. | |
| 2006/0224748 A1 | 10/2006 | Gupta et al. | |
| 2006/0265371 A1 | 11/2006 | Edmond et al. | |
| 2008/0016115 A1 | 1/2008 | Bahl et al. | |
| 2008/0062870 A1* | 3/2008 | Clower | ............... H04L 67/1063 370/230 |
| 2008/0267083 A1 | 10/2008 | MacCormick et al. | |
| 2009/0138592 A1 | 5/2009 | Overcash et al. | |
| 2009/0175172 A1 | 7/2009 | Prytz et al. | |
| 2010/0185760 A1 | 7/2010 | Nakahira | |
| 2013/0031211 A1 | 1/2013 | Johnson et al. | |
| 2013/0259043 A1 | 10/2013 | Yamashita | |
| 2014/0195656 A1 | 7/2014 | Hopkins | |
| 2014/0317196 A1 | 10/2014 | Maenpaa | |
| 2015/0049759 A1 | 2/2015 | Noyama et al. | |
| 2017/0171222 A1 | 6/2017 | Ling et al. | |
| 2017/0243212 A1 | 8/2017 | Castinado et al. | |
| 2018/0181751 A1 | 6/2018 | Jagadeesan et al. | |
| 2018/0302222 A1* | 10/2018 | Agrawal | ................ H04W 4/70 |
| 2019/0018887 A1* | 1/2019 | Madisetti | ............... G06Q 20/06 |
| 2019/0261433 A1 | 8/2019 | Turner et al. | |
| 2019/0373521 A1* | 12/2019 | Crawford | ...... H04W 36/008355 |
| 2020/0059369 A1* | 2/2020 | Li | .......................... H04L 9/0643 |
| 2020/0134206 A1 | 4/2020 | Thekadath et al. | |
| 2020/0379979 A1* | 12/2020 | Thekadath | .......... G06F 16/2379 |

FOREIGN PATENT DOCUMENTS

| | | |
|---|---|---|
| EP | 2031800 A1 | 3/2009 |
| EP | 2432164 A1 | 3/2012 |
| EP | 2464060 A1 | 6/2012 |
| EP | 1690398 B1 | 5/2015 |
| JP | 2009049458 A | 3/2009 |
| WO | 9963708 A2 | 12/1999 |
| WO | 2004110024 A1 | 12/2004 |
| WO | 2007127401 A2 | 11/2007 |

OTHER PUBLICATIONS

Anonymous, "Bitcoindeveloper Introduction," Bitcoin Developer, copyright 2009-2020, https://developer.bitcoin.org/reference/intro.html, 2 pages.

Antonopoulos, "Mastering Bitcoin—Unlocking Digital Cryptocurrencies," O'Reilly Media, Inc., Dec. 20, 2014, 282 pages.

Decker et al., "Information propagation in the Bitcoin network," IEEE Thirteenth International Conference on Peer-to-Peer Computing (P2P), Sep. 9, 2013, 10 pages.

International Search Report and Written Opinion mailed Sep. 20, 2018, Patent Application No. PCT/IB2018/054667, 15 pages.

International Search Report and Written Opinion mailed Sep. 26, 2018, Patent Application No. PCT/IB2018/054669, 15 pages.

Liang et al., "DagStream: Locality Aware and Failure Resilient Peer-to-Peer Streaming," Multimedia Computing and Networking 2006 6071:60710L, Jan. 16, 2006, 15 pages.

Lu et al., "Content-based peer-to-peer network overlay for full-text federated search," Large Scale Semantic Access to Content (Text, Image, Video, and Sound), May 30, 2007, 20 pages.

Nakamoto, "Bitcoin: A Peer-to-Peer Electronic Cash System," Bitcoin, Oct. 31, 2008, https://bitcoin.org/bitcoin.pdf, 9 pages.

Satoshi et al., "Connection Limits," Bitcoin Forum, Aug. 9, 2010, https://bitcointalk.org/index.php?topic=741.0; prev_next=prev, 2 pages.

Small et al., "Scaling Laws and Tradeoffs in Peer-to-Peer Live Multimedia Streaming," Proceedings of the 14th ACM International Conference on Multimedia, Oct. 2006, 10 pages.

UK Commercial Search Report mailed Jan. 12, 2018, Patent Application No. GB1713363.8, 7 pages.

UK Commercial Search Report mailed Nov. 15, 2017, Patent Application No. GB1710517.2, 9 pages.

UK IPO Search Report mailed Dec. 11, 2017, Patent Application No. GB1710517.2, 4 pages.

UK IPO Search Report mailed Jan. 15, 2018, Patent Application No. GB1713363.8, 5 pages.

Zookolaptop et al., "Bitcoin Wizards chat log Oct. 30, 2015," IRC Log, Oct. 30, 2015, https://irclog.whitequark.org/bitcoin-wizards/2015-12-30, 41 pages.

\* cited by examiner

PROBABILISTIC RELAY FOR EFFICIENT PROPAGATION IN A BLOCKCHAIN NETWORK

CROSS REFERENCE TO RELATED APPLICATIONS

This application is a continuation of U.S. patent application Ser. No. 17/751,466, filed May 23, 2022, entitled "PROBABILISTIC RELAY FOR EFFICIENT PROPAGATION IN A BLOCKCHAIN NETWORK," which is a continuation of U.S. patent application Ser. No. 16/627,727, filed Dec. 30, 2019, now U.S. Pat. No. 11,341,123, entitled "PROBABILISTIC RELAY FOR EFFICIENT PROPAGATION IN A BLOCKCHAIN NETWORK," which is a 371 Nationalization of International Patent Application No. PCT/IB2018/054667, filed Jun. 25, 2018, entitled "PROBABILISTIC RELAY FOR EFFICIENT PROPAGATION IN A BLOCKCHAIN NETWORK," which claims priority to United Kingdom Patent Application No. 1710517.2, filed Jun. 30, 2017, entitled "COMPUTER-IMPLEMENTED SYSTEM AND METHOD," and United Kingdom Patent Application No. 1713363.8, filed Aug. 21, 2017, entitled "COMPUTER IMPLEMENTED SYSTEM AND METHOD," the disclosures of which are incorporated herein by reference in their entirety.

FIELD OF INVENTION

This specification relates generally to computer-implemented methods and systems suitable for implementation in nodes of a blockchain network. Modified blockchain node structures, network architectures, and protocols for handling large numbers of transactions and large transaction blocks are described. The invention is particularly suited, but not limited, to use with the Bitcoin blockchain.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction 13 if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications.

According to Blochain.info [1], in April 2017 the average number of Bitcoin transactions per block was around 2000 units. In the near future, the constraints on the maximum block size may be relaxed and the number of transactions per block may increase significantly.

A competitive cryptocurrency needs to propagate as quickly as possible a high volume of unconfirmed transactions. By way of comparison, Visa electronic funds transfer has a peak capacity of 56 k transactions per second [2].

The current three-step messaging protocol for the exchange of new transactions in the Bitcoin network by means of inventories is not sufficient to cope with the fast dissemination of a volume of transactions several orders of magnitude larger than the current standard (~5 transactions per second [3]).

Today's Bitcoin network is heavily centred around mining, in terms of computational effort. With vastly increased volumes of transactions this is not necessarily going to be feasible. The solution described in this specification enables the Bitcoin network to handle the propagation of massive amount of transactions.

Known methods of sending data packets or transactions across the Bitcoin network e.g., dissemination of new transactions by means of a 3-steps messaging, result in slow propagation and dissemination of data packets across the network. The preliminary steps lead to queues in to and out of nodes.

SUMMARY OF INVENTION

Overall, the invention resides in a novel approach for the handling and propagation of increased amounts of transactions several orders of magnitude larger current blockchain capabilities. This can be achieved by supporting faster propagation and dissemination of data packets across the network by reducing the communications between nodes. Long queues in to, and out of, nodes caused by bottlenecks are inhibited by selectively relaying data packets according to the correlation between interfaces.

The method enables a node to behave in an adaptive manner such that it is (i) agnostic to the number of interfaces connected to peer nodes, and (ii) agnostic to changes associated with the interfaces of a node, such that new connections, broken connections and malicious nodes are accounted for—and the integrity of the network is maintained.

The method allows for a limitless number of interfaces on a node that can be managed, this the performance and size of the network is limitless because the method adapts to the network and nodes' circumstances. Inefficient transmissions are minimised and malicious nodes are circumvented.

The method enables improved blockchain network performance and provides an improved blockchain network, or overlay network that cooperates with a blockchain network.

Thus, in accordance with the present invention there is provided a method as defined in the appended claims.

Thus, it is desirable to provide a computer-implemented method for a node of a blockchain network, said node having a plurality of interfaces connected to peer nodes, the computer-implemented method comprising:

determining a correlation matrix having correlation coefficients representing the correlation between data processed at each interface of said node;

receiving data at a receiving interface of said node;

selecting at least one of a plurality of other interfaces of said node, and relaying said received data from the or each other interface, wherein other interfaces are selected according to a set of the correlation coefficients of the receiving interface.

The data can correspond to an object such as a transaction or a block.

An indicator can be derived from the correlation matrix and data is relayed if the correlation between the receiving interface and the other interface, or each other interface, is lower than the indicator. Relay can alternatively occur if the correlation is higher than the indicator.

The indicator can be a threshold. The indicator can represent a level, such as average value, of correlation between an interface receiving data and a plurality of interfaces. The average value can be the average of the correlation coefficients between the receiving interface and the other interfaces.

The indicator can be used to determine a metric, said metric setting criteria for selecting which of the other interfaces are selected to relay data.

The metric can be considered as instructions that are used to select which interfaces data is to be relayed from. The instructions can be set according to, or be dependent upon, the threshold or indicator.

The metric may be used to rank the correlation of (individual) interfaces between a node and one or more other nodes. This may provide the advantage of being able to better understand, and respond to, the quality of relay provided by node peers in the network. This is described in more detail below. This not only allows a more granular understanding of, and appropriate response to, network behaviour but can also provide advantages in relation to the detection of and response to malicious behaviour. Therefore, the invention can provide a more efficient and more secure network.

Each node in the network may be associated with a correlation matrix based only on received transaction flows. No correlation information may be exchanged between nodes or peers in the network to avoid the propagation of malicious information.

The instructions, by way of example, may require that the interfaces have a correlation index beneath the indicator. The instructions can determine which of the interfaces relays data according to whether the correlation index is above or below the indicator.

An example of data relay when the index is below the indicator can be normal steady-state network conditions. In a 'steady-state' condition the number of interfaces and connected peers remains unchanged, such that the correlation matrix is unchanged.

An example of data relay when the index is above the indicator can be changing conditions, such as the addition of new peer node connections to the node. Different instructions can apply to different interfaces.

The data distributed can include data received from a blockchain network, including data from miners, peer nodes and full nodes. The correlation between the data processed at each interface of the node can account for duplicates data packets or objects received at a node. The indicator can be an average or median value of the correlation indexes of each interface of a node. The indicator can define a point between lowest and highest correlated interfaces. Data or objects can be relayed from the interface when a correlation index according is beneath the indicator. Interfaces with low levels of correlation can be prioritised because it can be safely assumed that those with high correlation will get the data.

A node processes data via an interface, said processing encompassing sending and receiving data or objects, such as transactions or blocks.

The data can reside in network packets representing a serialised transaction and an Identification representing the connection to an adjacent or peer node. The interface can be a logical interface ID representing the TCP/IP connection to the sending/receiving peer.

The node can establish the correlation matrix by monitoring (i) the data Identifiers of each packet of data processed through each interface and (ii) Identical transactions processed through pairs of interfaces, and determines a correlation coefficient between any two interfaces therefrom.

The correlation matrix can have m(m−1) elements and can be used to determine a correlation index of an interface a, as follows:

$$c_a = \sum_{i=0}^{a-1} c_{ia} + \sum_{i=a+1}^{m-1} c_{ai}$$

wherein m is the number of interfaces connected to peer nodes.

The correlation matrix can have m(m−1) elements and can be used to determine a set of correlation coefficients for an interface a as follows:

$$\{C_a\} = [c_{0a}, c_{1a}, \ldots c_{am-1}].$$

The indicator can be determined by: determining a set of correlation coefficients, derived from the correlation matrix, for each interface connected to a peer node, said set having the connection coefficients between each interface; and deriving an average or median value from said set.

The indicator is used by a set of instructions to determine which interfaces relay data.

The indicator for determining the number of interfaces relaying data can be further based on at least one of: a reset time, being the time since node initiation or start-up; and a change time, being the time between change events including at least one of: a new peer node connecting to an interface; a terminated connection to an interface; and an interface connecting to a malicious node. The reset time can be used for new nodes. The change time can be used for existing nodes.

Upon node initiation the node can connect with peer nodes, such as those adjacent or directly connected to said node, and relay data via all interfaces for the reset time period, during which the correlation matrix is established, and after said period of time has passed the node relays all objects from the node via interfaces having a correlation index beneath the indicator.

Upon detecting a change event the correlation matrix can be reset and re-determined. This can occur when a periodical reset is required.

Upon detecting a change event the node can relay all objects from the node via interfaces having a correlation index above the indicator. This can occur when a 'soft' update is required.

Upon detecting a disconnection of a peer node from an interface the correlation matrix can be reset and re-determined. This can occur when a periodical reset is required.

Upon detecting a connection to a new peer node, said peer node connected to an interface, said interface can relay data via all other interfaces for: the reset period of time during; and/or the change time.

The node can generate original data and the number of interfaces selected to process and transmit said original data. This can be increased by raising the indicator to a number between the current, or nominal, number of interfaces selected for relay and the total number of interfaces.

It is also desirable to provide a computer readable storage medium comprising computer-executable instructions which, when executed, configure a processor to perform any of the methods as claimed.

It is also desirable to provide an electronic device comprising: an interface device; one or more processor(s) coupled to the interface device; a memory coupled to the one or more processor(s), the memory having stored thereon computer executable instructions which, when executed, configure the one or more processor(s) to perform any of the methods as claimed.

It is also desirable to provide a node of a blockchain network, the node configured to perform any of the methods as claimed.

It is also desirable to provide a blockchain network having a node, as claimed.

The invention as claimed is particularly suited, but not limited, to use with a Bitcoin (BTC) blockchain.

It is also desirable to provide a super-node of a blockchain network, the super node comprising: a plurality of nodes as claimed; and a shared storage entity for storing the blockchain, wherein the shared storage entity is either a common storage node, a distributed storage, or a combination of the two, and wherein blocks assembled by the plurality of nodes are sent to, and stored on, the shared storage entity whereby the shared storage entity maintains the blockchain. The shared storage entity comprises at least 100 gigabytes of storage capacity.

It is also desirable to provide a blockchain network comprising a plurality of super-nodes as claimed, wherein the super-nodes are connected on the blockchain network, wherein the shared storage entity of each super-node is configured to store a copy of the blockchain, and wherein the blockchain network comprises at least 10 super nodes.

Such an improved solution has now been devised.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Figure 1:
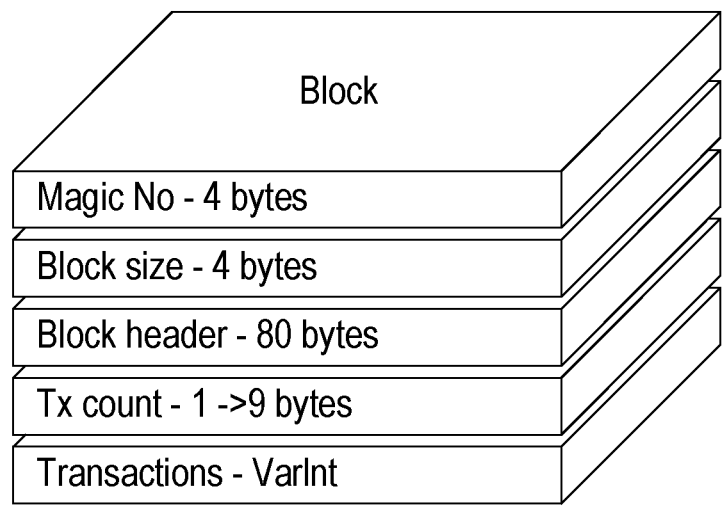
FIG. 1 shows the overall structure of a block.
Figure 2:
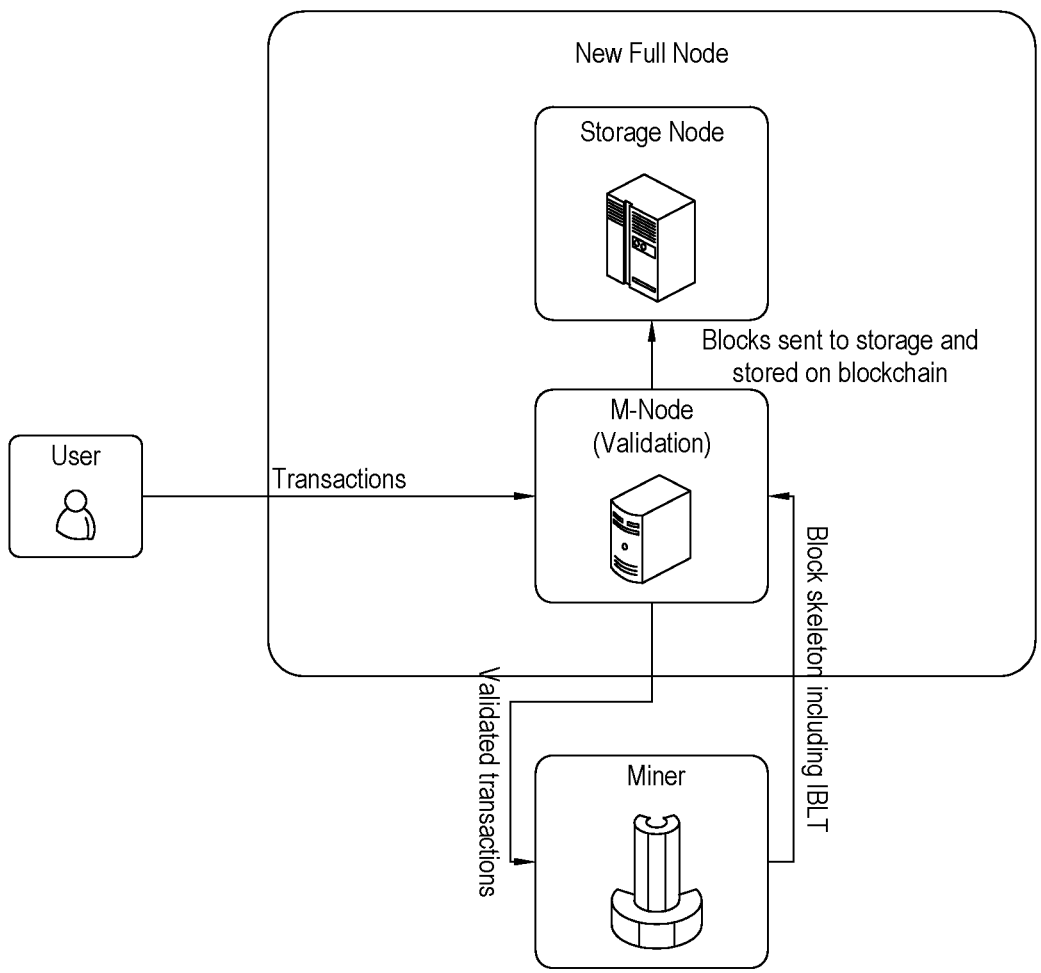
FIG. 2 shows a modified architecture for the Bitcoin network in terms of an operational diagram illustrating the steps from the moment a user submits a transaction until it ends up on the blockchain.
Figure 3:
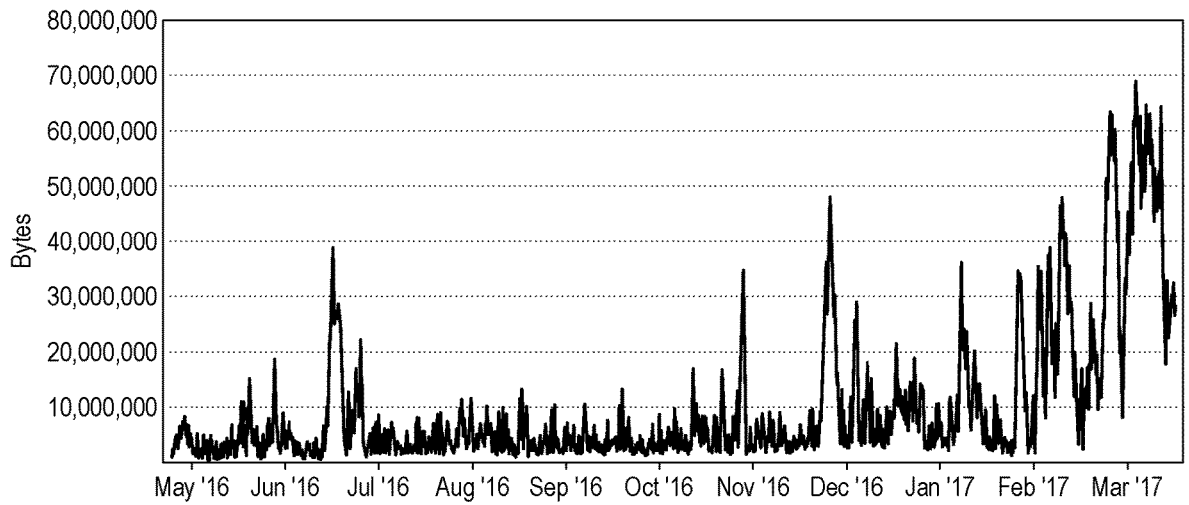
FIG. 3 shows a graph indicating an example of the aggregate size of transactions waiting in the MEMPOOL for confirmation.
Figure 4:
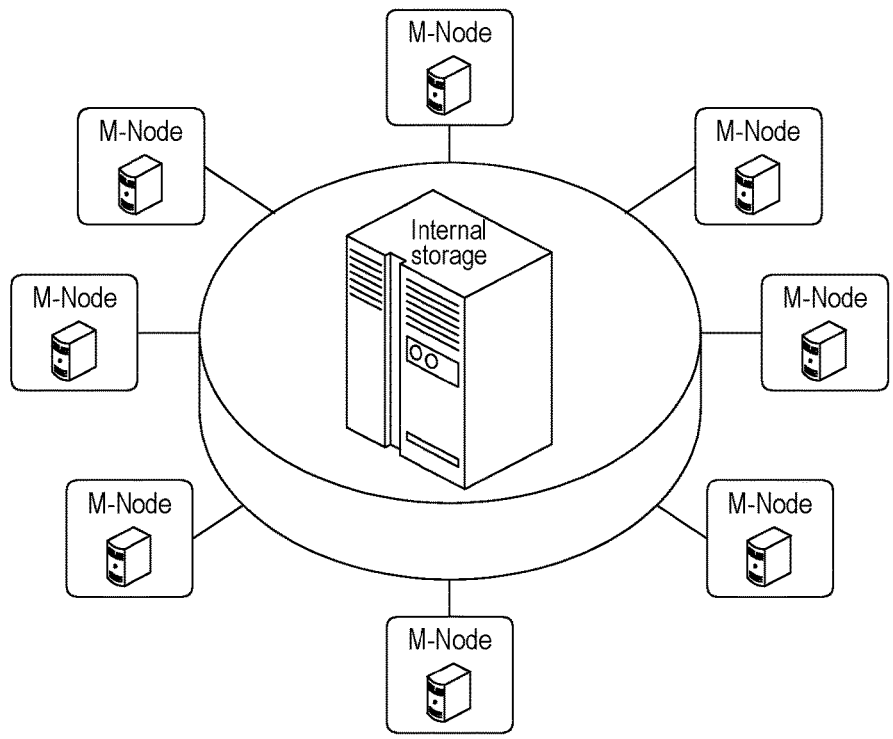
FIG. 4 shows a plurality of nodes linked to an internally centralized storage facility.
Figure 5:
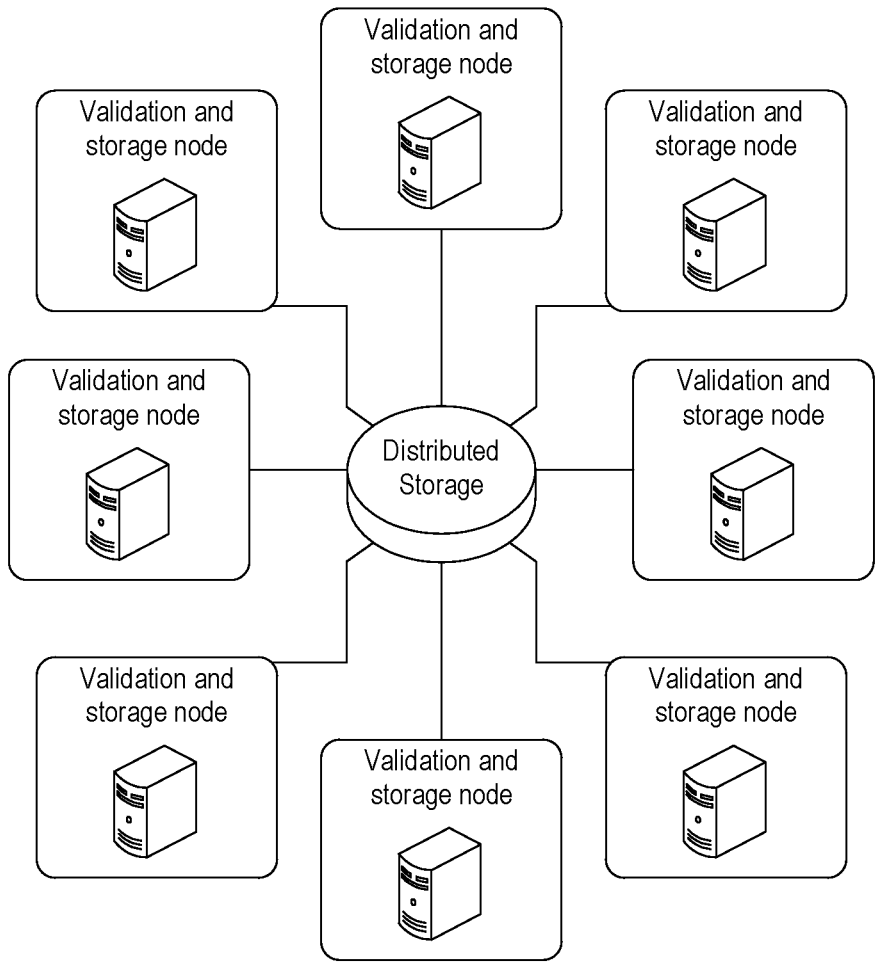
FIG. 5 illustrates a configuration in which each node is part of both a distributed MEMPOOL and a distributed storage facility.

In this specification a solution to the problem of processing and storing large Gigabyte-sized blocks is described.

Types of Blockchain Network Nodes & Validation Nodes

A blockchain network may be described as a peer-to-peer open membership network which may be joined by anyone, without invitation or without consent from other members. Distributed electronic devices running an instance of the blockchain protocol under which the blockchain network operates may participate in the blockchain network. Such distributed electronic devices may be referred to as nodes. The blockchain protocol may be a Bitcoin protocol, or other cryptocurrency, for example.

The electronic devices that run the blockchain protocol and that form the nodes of the blockchain network may be of various types including, for example, computers such as desktop computers, laptop computers, tablet computers, servers, computer farms, mobile devices such a smartphones, wearable computers such as smart watches or other electronic devices.

Nodes of the blockchain network are coupled to one another using suitable communication technologies which may include wired and wireless communication technologies. In many cases, the blockchain network is implemented at least partly over the Internet, and some of the nodes may be located in geographically dispersed locations.

Currently, nodes maintain a global ledger of all transactions on the blockchain, grouped into blocks each of which contains a hash of the previous block in the chain. The global ledger is a distributed ledger and each node may store a complete copy or a partial copy of the global ledger. Transactions by a node affecting the global ledger are verified by other nodes so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes may be of different types or categories, depending on their functionality. It has been suggested that there are four basic functions associated with a node: wallet, mining, full blockchain maintenance, and network routing. There may be variations of these functions. Nodes may have more than one of the functions. For example, a "full node" offers all four functions. A lightweight node, such as may be implemented in a digital wallet, for example, and may feature only wallet and network routing functions. Rather than storing the full blockchain, the digital wallet may keep track of block headers, which serve as indexes when querying blocks. Nodes communicate with each other using a connection-oriented protocol, such as TCP/IP (Transmission Control Protocol).

An additional type or category of node may be provided: a merchant node (herein referred to at times as an "M-node"). M-nodes are designed to focus on fast propagation of transactions. They may or may not store a full blockchain and do not perform mining functions. In that sense, they are similar to lightweight nodes or wallets; however, they include additional functionality to enable fast propagation of transactions. The operational focus of the M-nodes is the quick validation and propagation of unconfirmed transactions, particularly to other M-nodes, from which the unconfirmed transactions are quickly pushed out to other nodes in the blockchain network. To facilitate this functionality, M-nodes are permitted a greater number of incoming and, particularly, outgoing connections that might otherwise be permitted for nodes under the governing protocol.

The M-nodes may be collectively referred to as the merchant network (or "M-net"). The term "merchant" may be interpreted as meaning "specialised". The M-nodes may be integrated into the blockchain network. Each M-node is a specialized node on the blockchain network that meets certain hardware and performance capabilities that will ensure that it is able to carry out the functions of an M-node. That is, the M-net might be considered a sub-network within and distributed through the blockchain network. The M-Node(s) may be arranged and configured to perform one or more dedicated functions or services.

In order for the M-net to run reliably and be able to offer services at a certain security level, the M-nodes need to maintain a good overview of the whole M-net and thus an efficient routing protocol needs to be in place. Every time an M-node receives an initiating transaction it needs to broadcast it to several other M-nodes, as well as other nodes. In the context of the M-net, this amounts to finding a solution to the multiple traveling salesman problem (MTSP). There are a plethora of solutions that address this issue, any one of which may be employed in the M-net. The M-nodes each run routing optimization in some, up-to-date form.

In some implementations, the M-net is implemented as a decentralized IP multicast type of network. That is, to enable fast proliferation of an incoming transaction to the blockchain network, multicast may be used to ensure that the transaction is broadcast quickly throughout the M-net, allowing all the M-nodes to then focus on forwarding the transaction to other nodes in the blockchain network.

A multicast network architecture allows the possibility of simultaneous distribution of data towards a group of destination nodes, without data duplication for each of the nodes interested in receiving the information. If a node wants to receive a multicast transmission, it joins the multicast group (registration phase) and after that it will be able to receive all the data sent over the multicast group. IP multicast can scale to a larger receiver population by not requiring prior knowledge of how many receivers there are and the network infrastructure is used efficiently by requiring the source to send a packet only once. For the nature of a multicast network, the use of connection oriented protocols (like TCP) is impractical due to simultaneous communication with a large number other nodes. Accordingly, a connectionless protocol is used.

Some blockchain networks, such as Bitcoin, use TCP for node-to-node communications. Data packets sent using TCP have an associated sequence number which is used for ordering purposes.

In addition to this, the TCP protocol involves a three-way handshake procedure, both when establishing a connection as well as terminating one. Packets sent over TCP come with an overhead associated, they have a sequence number associated and there is a three-way handshake protocol. In establishing a connection 128-136 bytes are being transmitted, whereas closing a connection costs 160 bytes. Thus the handshake in packet transmission costs up to 296 bytes.

Additionally, when a node receives a new transaction, it notifies the other nodes with an inventory (INV) message which contains the hash of the transaction. A node which receives an INV message checks whether the hash of that transaction has been seen before; if not, the node will request the transaction by sending a GETDATA message. The time necessary to transmit a transaction from Node A to Node B is T1=vertfication+TCP(inv+getdata+tx), where TCP( ) indicates the overhead, in terms of time, introduced by the TCP handshake procedure.

The TCP Protocol and the Three-Way Handshake

The current peer-to-peer Bitcoin protocol defines 10 data messages and 13 control messages. In this context, the transfer of data, or data packets, relates to object transfer may refer to individual transactions or blocks.

A complete list of the messages used by the Bitcoin P2P protocol is known—please refer to [4] for the complete list.

A sub-group of messages are related to the request or distribution of objects. These messages are BLOCK, GETDATA, INV, TX, MEMPOOL and NOTFOUND.

A BLOCK message transmits a single serialized block and can be sent for two different reasons. Either a nodes will always send it in response to a GETDATA message that requests the block with an inventory type of MSG_BLOCK (provided the node has that block available for relay). Or, alternatively, nodes or miners may send unsolicited block messages broadcasting their newly-mined blocks to their peers.

The GETDATA message requests one or more data objects from another node. Typically, the objects are requested by an inventory previously received by means of an INV message. The response to GETDATA message can be a TX message, BLOCK message or NOTFOUND message.

The GETDATA message cannot be used to request arbitrary data, such as historic transactions no longer in the memory pool or relay set. The GETDATA message should be used to request objects from a node which previously advertised them.

The INV message (inventory message) transmits one or more inventories of objects known to the transmitting peer. It can be sent: unsolicited to announce new transactions or blocks; or in reply to a GETBLOCKS message or MEMPOOL message. The receiving peer can compare the inventories from an INV message against the inventories previously stored, in order to request unseen objects.

The TX message transmits a single transaction. It is sent in response to a GETDATA message requesting the transaction using an inventory with the requested transaction Identification (ID).

The MEMPOOL message requests the IDs of transactions that the receiving node has verified as valid but were not published in a block, i.e. transactions which are in the receiving node's memory pool.

The response to this message is one or more INV messages containing the transaction IDs. A node sends as many INV messages as needed to reference its complete memory pool. Full nodes can use MEMPOOL messages to quickly gather most or all of the unconfirmed transactions available on the network. Nodes can set a filter before sending a MEMPOOL to only receive transactions that match that filter.

The NOTFOUND message is a reply to a GETDATA message requesting an object which is not available for relay at the receiving node. For instance, nodes may have pruned spent transactions from older blocks, therefore the transmission of these blocks is not possible.

A sub-group of messages are related to the reliability and efficiency of objects. These messages are FEEFILTER, PING, PONG and REJECT.

The FEEFILTER message is a request to the receiving peer to not relay transactions in INV messages if their fee rate is below the specified value. MEMPOOL limiting provides protection against attacks and spam transactions that have low fee rates and are unlikely to be included in mined blocks. The receiving peer may choose to ignore the message and not filter transactions in INV messages.

The PING message helps confirm that the receiving peer is still connected. If a TCP/IP error is encountered when sending the ping message, e.g. connection timeout, the transmitting node can assume that the receiving node is disconnected. The response to a ping message is a PONG message. The message includes a nonce.

The PONG message replies to a ping message, proving to the pinging node that the ponging node is still alive. By default, Bitcoin Core disconnects from any clients which have not responded to a ping message within 20 minutes. To allow nodes to keep track of latency, the PONG message sends back the same nonce received in the corresponding ping message.

The reject message informs the receiving node that one of its previous messages has been rejected. Examples of reasons to reject a message can include:

Message could not be decoded.
Block is invalid, i.e. invalid proof-of-work or invalid signature were provided.
Transaction is invalid, i.e. invalid signature or output value greater than input were provided.
The block uses a version that is no longer supported.
Connecting node is using a protocol version that the rejecting node does not support.
A transaction spends the same input as a previously-received transaction (double spend).
The transaction did not have a large enough fee or priority to be relayed or mined.

By way of example, nodes 'i' and 'j' on the Bitcoin network communicate using the following steps:

1. Node i transmits an INV message containing a list of transactions.
2. Node j replies with a GETDATA message asking for a subset of the transactions previously announced.
3. Node i transmits the requested transactions.

The method herein seeks to optimise the protocol of a blockchain network to improve, at least, the dissemination of data.

Figure 6:
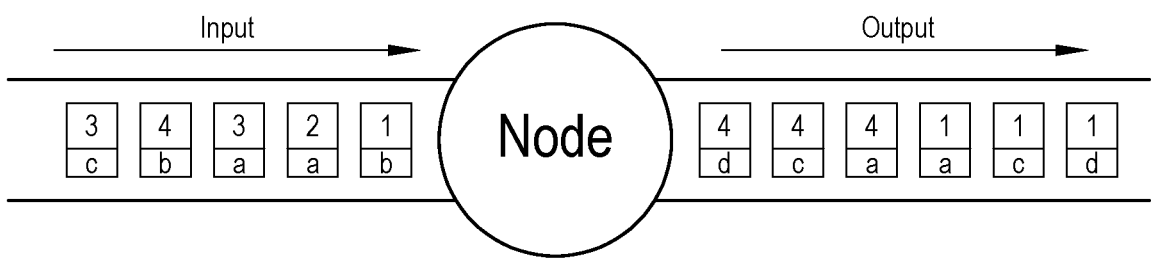
FIG. 6 illustrates network packets serially sent and received at application-level via a node on a bitcoin network.

FIG. 6 illustrates the real scenario where data, in the form of network packets, is serially sent and received at application-level according to the primitives provided by the operating system.

Assuming that a transaction x fits in a single Ethernet/IP packet, its transmission to m peers requires the buffering of m different output packets. Both input and output network packets, along with other information, will contain:

A serialized transaction.
A logical interface ID representing the TCP/IP connection to the sending/receiving peer.

The expected time for an incoming transaction to be processed depends on the average length (in packets) of the input queue $L^i$, while the expected time for a processed transaction to be correctly transmitted depends on the average length of the output queue $L^o$.

Therefore, the efficient relay of transactions relies on the reduction of both $L^i$ and $L^o$ values. However, a probabilistic model for selective relay of the transactions to the peers directly affects $L^o$ and by induction also $L^i$.

In the current Bitcoin implementation, INV and GETDATA message packets are queued in the I/O buffers in the same way as transactions, with a severe impact on the transmission and reception delays.

Efficient Transactions Propagation—Probabilistic Relay

If node i was allowed to directly transmit new transactions without the use of inventory exchanges, the transactions would be disseminated in the network at a faster rate. Without some sort of regulation, however, the network would be flooded.

The method herein, therefore, uses a mechanism for the selective relay of data or objects from a node to a peer node to avoid the transmission of a huge amount of unnecessary transactions. Thus, the invention provides improved network efficiency and reduces the amount of resource required by the network. The mechanism can be a probabilistic model.

Figure 7:
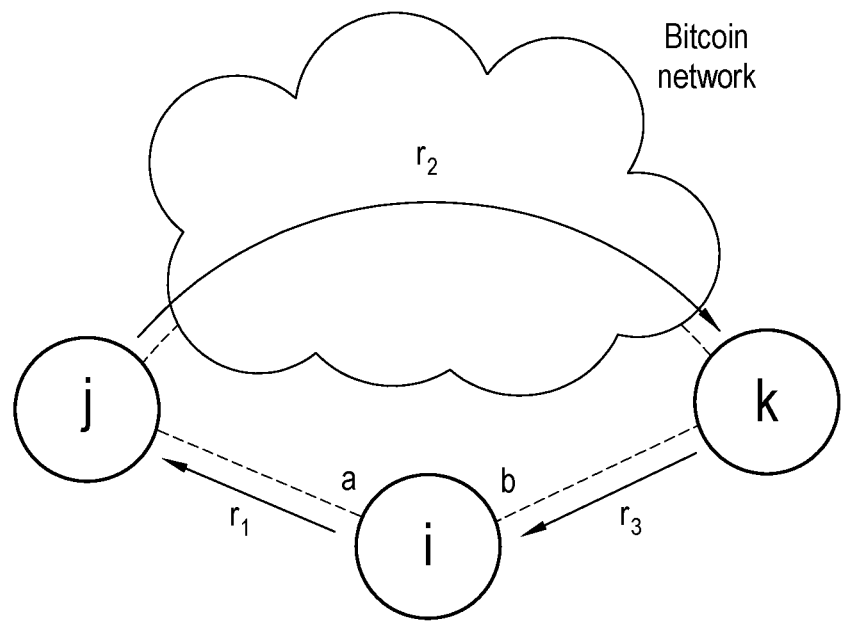
FIG. 7 represents the route taken by a single transaction between nodes and across the bitcoin network.

The mechanism, or probabilistic model, for transaction relay is based on assumptions, with reference to FIG. 7 in which three nodes i, j and k are part of a Bitcoin network and connected together. Node i is directly connected to Node j and Node k. Nodes j and k are indirectly connected via Node i or via the Bitcoin network.

Node i is shown having two interfaces a and b that process data in the form of a transaction r, which is initiated at Node i and experiences various stages as it is propagated between nodes and across the Bitcoin network, said stages including:

a first stage $r_1$ processes the transaction for transmission from interface a, to a peer node and is received at Node j,
a second stage $r_2$ Node j processes the transaction for transmission across the Bitcoin network is received at Node k, and a third stage $r_3$ Node k processes the transaction for transmission to peer Node I, which receives the transaction at interface b.

For the avoidance of doubt, $r_1$, $r_2$ and $r_3$ are the same transaction and the suffixes represent a relay.

The assumptions below are made:

If a node receives from an interface (b) the same transaction which was processed for transmission from another interface (a), then the two interfaces share a degree of correlation.

If a transaction generated at node i reaches node j through a given j's input interface, then a second transaction generated at node i will reach j through the same interface with high probability.

Referring again to FIG. 7, as an example of relay correlation, Nodes j and k are peers of Node i. If i generates a new transaction and relays it to node j, and later the same transactions is received at Node i from Node k, then j and k share a logical path through the network. Therefore, the originating node does not need to relay the same information to both its peer nodes. To be clear, Node i does not need to transmit transaction r to Node k because the probability of Node k receiving said transaction is high. Similarly, in reverse, Node k does not need to transmit transaction r to Node i because the probability of receiving said transaction is high. The logic is valid in both directions.

Relationships Between Interfaces of a Node

Figure 8:
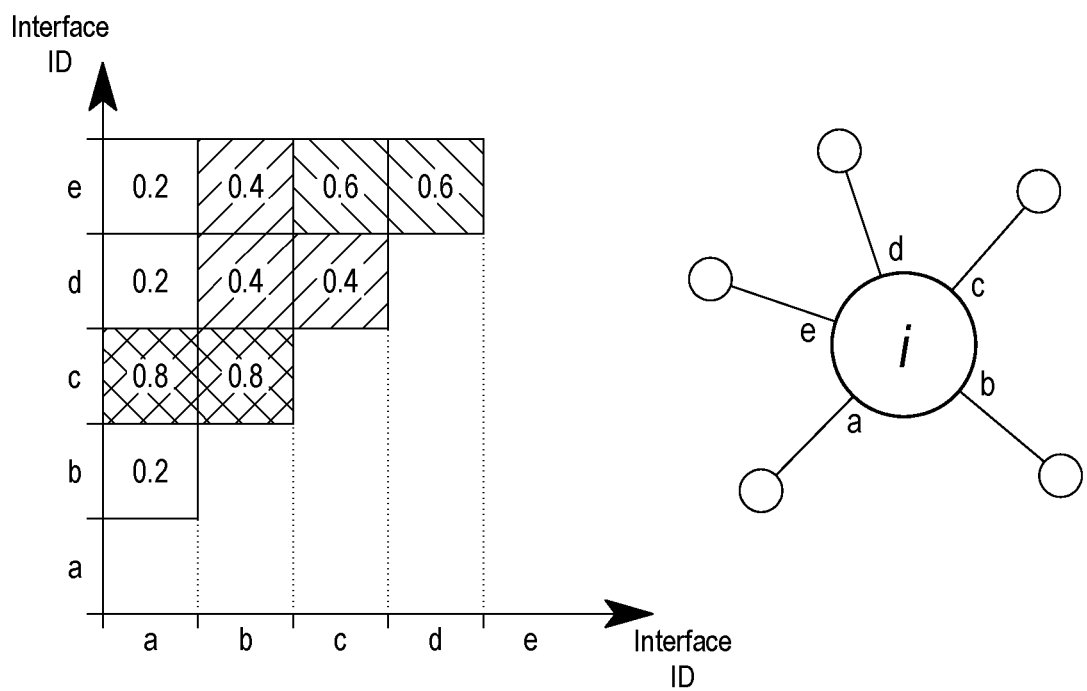
FIG. 8 is an illustration of a correlation matrix showing the correlation coefficients of the interfaces connected to peer nodes.

FIG. 8 is an example of a local correlation matrix C that can be determined for a Node i having five interfaces—a, b, c, d and e—connected to peer nodes. The matrix represents the degree of correlation for the incoming traffic. The formation and application of said matrix is described below. The values shown in FIG. 8 are for illustration purposes.

Each node establishes a correlation matrix C by determining, by way of example, coefficients $c_{ab}$ representing the correlation between the transactions received from interfaces a and b. Such a coefficient is determined between all pairs of the interfaces.

Using the list of transaction IDs received from each interface, let $t_a$ and $t_b$ be the number of transactions received from interfaces a and b respectively, and $t_{ab}$ be the number of duplicate transactions received from both a and b. The correlation coefficient for interfaces a and b is defined by Formula 1:

$$c_{ab} = \frac{t_{ab}}{\max\{t_a, t_b\}} \leq 1 \quad \text{(Formula 1)}$$

As a convention, for a coefficient $c_{ab}$, we assume a lexicographical order a<b of its indexes i.e. a is assigned '0' (a=0), b is assigned '1' (b=1) and c is assigned '2' (c=2), and so on between interface IDs and numerical values. Given the correlation coefficients for a set of interfaces {a, b, d, e}, then interfaces a and b are more correlated than interfaces d and e if $c_{ab} > c_{de}$.

Since the elements on the main diagonal are not significant, the matrix size can be reduced to m(m−1) elements, as shown in FIG. 8.

Assigning a Value to a Node Interface

An overall correlation index of an interface a is defined in Formula 2, as follows:

$$c_a = \sum_{i=0}^{a-1} c_{ia} + \sum_{i=a+1}^{m-1} c_{ai} \quad \text{(Formula 2)}$$

Using the correlation matrix in FIG. 8 as an example, the correlation index $c_a$ for interface a can be expressed as the sum of the correlation coefficients between each interface.

$$c_a = c_{ab} + c_{ac} + c_{ad} + c_{ae} = 0.2 + 0.8 + 0.2 + 0.2 = 1.4$$

This metric can be used to rank the correlation of the individual interfaces and understand the quality of relay provided by the node peers. By way of example, if the correlation index of a is significantly higher than the average value, then the transactions received from a are highly redundant.

Conversely, if a correlation index of a is significantly lower than the average value, then either (i) the transactions received from a are somewhat unique or (ii) the peer node connected to a is behaving maliciously. Malicious behaviour is discussed in more detail below.

It is to be noted that each node builds its own correlation matrix based only on the received transaction flows. No correlation information is exchanged between nodes or peers to avoid the propagation of malicious information.

Indicator

Given an incoming transaction from interface a, the node will perform the relay to a number of peers m* in the range $[m_{min}, m_{max}]$.

The current value m* depends on the current distribution of the m−1 correlation coefficients $\{c_a\}$ containing connection index a:

$$\{c_a\} = [c_{0a}, c_{1a}, \ldots c_{am-1}]$$

In other words, $\{c_a\}$ is the list, or set, of correlation coefficients—this set having the coefficients for interface a. The connection index is a summation of the coefficients, i.e. $c_a = c_{ab} + c_{ac} + c_{ad} + c_{ae}$, as per FIG. 8 and the example above.

The number of interfaces m*(a) selected for relay from interface a depends upon the computation of a metric $\theta_i^{(a)}$ for each element of the set $\{c_a\}$, wherein:

$$m*(a) = \sum_{i=0}^{m-1} \theta_i^{(a)}$$

The metric $\theta_i^{(a)}$ functions as a switch, or selector, and indicates whether an interface will relay data, or not. For example, an interface will relay data if its metric is '1' and not relay data if its metric is '0'.

By defining $\overline{c_a}$, as the average value of the coefficients within the set $\{c_a\}$, the metric $\theta_i^{(a)}$ contributes to m*(a) if the corresponding correlation coefficient $c_{ai}$ is lower than $\overline{c_a}$:

$$\theta_i^{(a)} = \begin{cases} 1, & c_{ai} \leq \overline{c_a} \\ 0 & c_{ai} > \overline{c_a} \end{cases}$$

$\theta_i^{(a)}$ may alternatively be based on the median value of $\{c_a\}$ rather than the average value. The metric $\theta_i^{(a)}$ can also be based upon, or determined from, alternative values derived from the set $\{c_a\}$ using statistical analysis, e.g. the metric $\theta_i^{(a)}$ contributes to m*(a) if the corresponding correlation coefficient $c_{ai}$ is at least one standard deviation beneath the mean of the set $\{c_a\}$.

An incoming transaction, by way of example from interface a in FIG. 8, will be relayed to the m*(a) least correlated interfaces according to the correlation coefficients in $\{c_a\}$. A subset of $\{c_a\}$ selected for relay will be defined as $\{c^*a\}$.

Returning to the example of FIG. 8, if $\{c_a\}=\{0.2, 0.8, 0.2, 0.2\}$, then, $$\overline{c_a} = 0.35$$
$$\theta_b^{(a)} = 1$$
$$\theta_c^{(a)} = 0$$
$$\theta_d^{(a)} = 1$$
$$\theta_e^{(a)} = 1$$

Therefore, the number of interfaces m*(a) selected for relay from interface a is '3'. The coefficients in the subset falling below the average value, or indicator, which determine the metric $\theta_i^{(a)}$, are $\{0.2, 0.2, 0.2\}$, said coefficients corresponding to $\{c^*a\}$ and interfaces b, d, e, are selected for relay.

The 'cut-off point', or level of coefficient that was used to determine the metric in the example above, was the average of the coefficients—'0.35'. This threshold, or indicator, determines the metric $\theta_i^{(a)}$ from which m*(a) is determined.

Overall, therefore, the method can be said to relay data from an interface according to an indicator. Said indicator can be used to determine a metric for each interface that determines whether it will relay data, or not.

While the indicator has been used to determine the metric in the example above, other factors can influence the metric for each interface. The metric for each interface can be calculated according to changes to the correlation matrix.

Accommodating Changes

The determination of which interfaces are to be used to relay information, as described above, assumes a steady-state condition in which the matrix is unchanged.

Further details of the protocol are now provided below for an explanation of how the protocol can accommodate change—for example when peer nodes join the network and make new connections with a node, or when peer nodes leave the network and are no longer connected to an interface of a node.

When accommodating change, data can be relayed based on the metric, which takes in to account the indicator and, ergo, the correlation index.

Start-Up

When a node i boots up, it initializes m peer connections with other nodes in the blockchain, such as the Bitcoin network. See, for example, the Bitcoin developer reference [4] for full details. At the initial stage, node i does not have any information about the correlation between data passing through its interfaces and has a limited set of data representing data passing or flowing therethrough. Therefore, full transaction relay will be performed for an amount of time.

During this period $T_{bootup}$ the metric $\theta_i^{(a)}$ contributes to m*(a) by setting each interface to '1' and relaying data from all interfaces. The metric, therefore, allows data to be relayed irrespective of the indicator for a period of time.

The length of period $T_{bootup}$ is a function $f(m)$ of m, i.e. a higher number of connections requires a longer amount of time to build an accurate correlation matrix. The following functions are proposed, by way of example only:

$$f_1(m) := m \quad f_2(m) := m^2$$

After $T_{bootup}$, node i performs the selective relay as per the existing nodes presented below.

Existing Nodes

The connections of a generic node j will vary with time in light of a change, such changes because of other nodes either (i) joining, (ii) leaving the network, and/or (iii) behaving maliciously, said malicious nodes selectively blacklisted and the corresponding connections closed.

Therefore, any change in the whole network graph, can be detected and parametrized by a quantity $T_{change}$ representing the average time between two (or more) consecutive change events. Once every $T_{change}$, node j's local correlation matrix needs to be updated.

Updates to the correlation matrix of a node can include at least one of:

A periodic reset, wherein the correlation matrix is reset. As per new nodes, full transaction relay will be performed for an amount of time $T_{bootup}$. Then, node j performs the selective relay on its new m* values for each interface connected to a peer node.

An update, wherein the correlation matrix is updated. For a given interface a, the $\beta$ highest correlated interfaces, $0<\beta<m_{min}$, from the selected set $\{c^*a\}$ will be swapped with the $\beta$ least correlated interfaces not in $\{c^*a\}$.

In other words, while data is relayed, normally, to the m*(a) least correlated interfaces in the subset $\{c^*a\}$, when the matrix is updated interfaces that are not part of the subset $\{c^*a\}$ and have low correlation indexes will be added to said subset in place of those having a high correlation index within said subset. This can ensure the integrity of the flow of data across the network in time of change.

Returning again to the example of FIG. 8, normally, $$c_d = c_{da} + c_{db} + c_{dc} + c_{de} = 0.2 + 0.4 + 0.4 + 0.6 = 1.6$$

$$\{c_d\} = \{0.2, 0.4, 0.4, 0.6\}$$

Taking $\overline{c_d}$ as the average value of the coefficients within the set $\{c_d\}$, the metric $\theta_i^{(a)}$ contributes to m*(d) if the corresponding correlation coefficient $c_{di}$ is lower than $\overline{c_d}$:

$$\theta_i^{(d)} = \begin{cases} 1, & c_{di} \le \overline{c_d} \\ 0 & c_{di} > \overline{c_d} \end{cases}$$

Then, $$\overline{c_d} = 0.4$$
$$\theta_a^{(d)} = 1$$
$$\theta_b^{(d)} = 1$$
$$\theta_c^{(d)} = 1$$
$$\theta_e^{(d)} = 0$$

Normally, the number of interfaces m*(d) selected for relay from interface d is '3'. The coefficients in the subset falling below the average value, or indicator, which determine the metric $\theta_i^{(d)}$, are $\{0.2, 0.4, 0.4\}$, said coefficient corresponding to $\{c^*a\}$ and interfaces a, b and c are selected for relay. For the avoidance of doubt, the coefficient corresponding to interface e i.e. {0.6} is not within the selected subset {c*d}.

When an update occurs, in relation to interface d, it happens that there are two β highest correlated interfaces within the set {c*d}—these being interfaces b and c, both with values of 0.4.

There is only one interface that qualifies as the β least correlated interfaces not in {c*d}, said interface being e. Therefore, only one 'swap' can be made and the choice of which interface to swap with is either b or c, because both have the same coefficient of 0.4. By way of example, the selection of which interface is selected for a swap can be made according to the lexicographic priority.

This interface is then swapped with the β least correlated interfaces not in {c*a}, which means the lowest coefficients will be selected from the remaining coefficients from the set, $\{c_d\}=\{0.4, 0.4, 0.6\}$. The lowest coefficients correspond to interfaces b and c, and, therefore data will be relayed to peer nodes connected to these interfaces rather than interface a.

If a peer disconnects, its coefficients in the correlation matrix will become invalid. At the end of the $T_{change}$ period, the above mentioned periodical reset is required. Then, node j performs the selective relay on its new m* values for each connection interface.

If a new peer b joins, the interface to which it is connected will be chosen for relay regardless of the current values of {c*a} for each other peer interface with node a. By way of example, the interface with b can be randomly selected for relay every y incoming transactions for an amount of time $T_{join}$.

$T_{join}$ is set according to $T_{bootup}$ and/or $T_{change}$ periods. This relay will help node b to build its own correlation matrix. At the end of $T_{join}$, b will be selected for relay according to the updated values {c*a} for each other peer interface at node a only.

Node i may require to check if its peer j is still alive because no incoming traffic was received from its interface. A temporary relay request for an arbitrary small amount of time $T_{temp}$ can be sent to j.

Nodes who publish a new transaction, i.e. originating nodes, need to select the sets of selected peers for relay carefully to guarantee the dissemination in the network. For instance, a number of nodes m** for any interface a can be selected as first relay, with m*(a)<m**<m.

The whole list of parameters is detailed in Table 1, below.

TABLE 1

| Parameter | Description |
|---|---|
| m | Number of peers of a Bitcoin node (vertex degree). |
| $m_{min}$ | Minimum number of selected peers for relay. |
| $m_{max}$ | Maximum number of selected peers for relay. |
| m*(a) | Current number of selected peers for relay of transactions coming from interface a. |
| m** | Number of selected peers for relay of transactions at the originating node. |
| $\{C_a\}$ | List of peers' correlation coefficients of transactions coming from interface a. |
| $\{C*_a\}$ | List of selected peers' correlation coefficients for relay of transactions coming from interface a. |
| $\overline{c_a}$ | Average value of $\{C_a\}$. |
| $c_{ab}$ | Correlation coefficient for interfaces a and b. |
| $t_a$ | Number of transactions received from interface a. |
| $t_{ab}$ | Number of duplicate transactions received from both interfaces a and b. |
| $T_{bootup}$ | Time required for a new node to build a stable correlation matrix. |
| $T_{change}$ | Time window between two consecutive local correlation matrix updates. |
| $T_{join}$ | Time window for dedicated relay to a new peer. |
| $T_{temp}$ | Time window for temporary relay to a peer. |
| β | Number of interfaces selected for soft update. |
| γ | Fraction of the number of incoming transactions relayed to a new peer. |

Malicious Nodes

A malicious nodes aims to make the probabilistic model for transaction dissemination less efficient. A malicious node can function or act in any of the following ways.

A malicious node does not propagate the transactions that are supposed to be propagated. Honest nodes connected to this malicious node may be able to retrieve these transactions from other honest (or malicious) peers. However, a complete dissemination of a transaction in the network is not required, assuming that a set of miners can still receive and include them in a new mined block.

A malicious node propagates the same legit transaction multiple times. The receiving node is able to keep track of the previously received transactions by means of a look-up table. Therefore, misbehaviour is easily detectable and malicious peers will be removed.

A malicious node propagates invalid transactions. If the receiving node performs transaction validation, misbehaviour is easily detectable and malicious peers will be removed.

A malicious node generates and propagates a huge number of dummy transactions. Receiver nodes can respond differently to a flood of valid incoming transactions from a peer. In response, (i) the receiver will ask the transmitter to reduce the transaction relay rate. If the problem persists, the transmitter peer will be removed, (ii) the receiver can ask (and check) for a minimum transaction fee on the relayed transactions. This makes the attack expensive for a malicious node. If the minimum transaction fee is not respected, the transmitter peer will be removed, and/or (iii) the transmitter peer is simply removed.

Based on the previously mentioned attacks and the probabilistic model, the following properties can be inferred.

Transaction relay rate depends on both bandwidth availability and processing performance of the individual nodes. For this reason, a default maximum rate is not enforced.

Malicious nodes cannot simply stay silent. They must forward valid transactions to keep their connections alive.

Messages

To support the implementation of the method herein, which encompasses a probabilistic relay of data or objects from node interfaces on the Bitcoin network, new message types can be introduced. Moreover, some of the current message types detailed above in relation to the current peer-to-peer Bitcoin protocol are no longer used, while those not mentioned below are unchanged with respect to the Bitcoin P2P protocol.

Data Messages

The message GETDATA to request one or more data objects from another node is no longer used, or removed from use. Similarly, message INV that transmit one or more inventories of objects known to the transmitting peer is no longer used, or removed from use. The NOTFOUND message as reply to GETDATA is no longer used, or removed from use.

The MEMPOOL message, already introduced above, requests the IDs of transactions that the receiving node has verified as valid but were not published in a block, i.e. transactions which are in the receiving node's memory pool. The response to this message is one or more INV messages containing the transaction IDs. A node sends as many INV messages as needed to reference its complete memory pool. A node may disable this feature, therefore transmission of its local MEMPOOL is not required.

Control Messages

PING and PONG messages to confirm that a peer is still connected are removed. Silent nodes, such as malicious nodes, are managed as described above. Message FEEFILTER is kept unchanged. However, peers who do not respect the fees threshold will be removed.

New Messages TEMP and FLOW are Introduced.

- The TEMP message is used when a node is required to check if a peer is still alive because no incoming traffic was received from its interface. A temporary relay request TEMP (for an arbitrary small amount of time $T_{temp}$) is sent to the peer connected to said interface. If the receiving peer starts relaying but does not respect the given time window $T_{temp}$, it will be removed from the matrix.
- The FLOW message is used when a node requires a peer to modify the transaction relay rate (e.g. number of transactions per second) according to the local flow control. The rate may increase, decrease or temporarily be suspended (relay rate=0). If the receiving peer does not respect the new relay rate, it will be removed. A new FLOW request will be required to modify the current relay rate. If the receiving peer does not receive a second FLOW request to resume the relay, it will remove the sender.
- The MINFEE message is used when a node is required to receive transactions filtered by a minimum transaction fee. The minimum value can be set for individual transactions and/or total amount of fees in case of multiple transactions fit in a single IP packet. If the receiving peer does not respect the transaction fee limit, it will be removed.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

SUMMARY

Today's Bitcoin network is heavily centred around mining, in terms of computational effort. With vastly increased volumes of transactions this is not necessarily going to be feasible. The solution described in this specification leads to a probabilistic relay able to handle the propagation of massive amount of transactions.

The invention can provide a method of dissemination of data packets in addition to, or preferably alternatively to, known methods of sending data packets or transactions across the a blockchain network such as the Bitcoin network e.g. dissemination of new transactions by means of a 3-steps messaging.

The invention can support faster propagation and dissemination of data packets across the network by reducing the communications between nodes.

Moreover, long queues caused by bottlenecks at nodes are inhibited by selectively relaying data packets according to the correlation between interfaces.

The overall number of packet transmissions is reduced while keeping a safe level of information redundancy.

Finally, the invention can provide an adaptive means for accommodating changes associated with the interfaces of a node, such that new connections, broken connections and malicious nodes are accounted for such that the integrity of the network is maintained. This means that there is no maximum limit on the number of interfaces on a node that can be managed and that the performance and size of the network is not limited because the method adapts to the network and nodes circumstances. Inefficient transmissions are minimised and malicious nodes are circumvented.

REFERENCES

[1] Bitcoin transaction levels are made available via Blockchain Luxembourg S.A.R.L. and retrievable from http://blockchain.info.
[2] VISA transaction levels are summarised in a document published by Visa Inc. Visa Inc at Glance. June 2015. It is retrievable from http://usa.visa.com/dam/VCOM/download/corporate/media/visa-fact-sheet-Jun2015.pdf.
[3] Decker, Christian and Wattenhofer, Roger (2013). Information propagation in the bitcoin network. IEEE Thirteenth International Conference on Peer-to-Peer Computing (P2P), 2013.
[4] A Bitcoin Developer Reference is retrievable from http://bitcoin.org/en/developer-reference.

What is claimed is:

1. A computer-implemented method, comprising:
    determining a correlation matrix having correlation coefficients representing a correlation between data processed at each interface of a node of a blockchain network, said node having a plurality of interfaces connected to peer nodes;
    receiving data at a receiving interface of said node, wherein the data corresponds to a transaction, determining a correlation index to determine whether the transaction is unique;
    selecting one or more other interfaces of said node according to a set of the correlation coefficients of the receiving interface, wherein the selection is based at least in part on a metric derived from the correlation matrix and historical data regarding previous transmissions at the selected interfaces;
    dynamically adjusting the correlation matrix and the metric in response to network changes; and relaying said received data from the selected one or more other interfaces based on the adjusted correlation matrix.

2. The method according to claim 1, wherein an indicator is derived from the correlation matrix and data is relayed if the correlation between the receiving interface and the or each other interface is lower than the indicator.

3. The method according to claim 2, wherein the indicator is used to determine a metric, said metric setting criteria for selecting which of the other interfaces are selected relaying data.

4. The method according to claim 1, in which the data resides in network packets representing a serialised transaction and an identification representing the connection to an adjacent or peer node.

5. The method according to claim 1, wherein the node establishes the correlation matrix by monitoring:
(i) data identifiers of each packet of data processed through each interface; and
(ii) identical transactions processed through pairs of interfaces; and
determines a correlation coefficient between any two interfaces therefrom.

6. The method according to claim 1, wherein the correlation matrix having m(m−1) elements is used to determine a correlation index of an interface a, as follows:

$$c_a = \sum_{i=0}^{a-1} c_{ai} + \sum_{i=a+1}^{m-1} c_{ai}$$

wherein m is the number of interfaces connected to peer nodes, $c_a$ is the correlation index of an interface a, and $C_{ia}$ is a correlation coefficient.

7. The method according to claim 1, wherein the correlation matrix having m(m−1) elements is used to determine a set of correlation coefficients for an interface a, as follows:

$$\{C_a\} = [c_{0a}, c_{1a}, \ldots c_{am-1}].$$

wherein $c_a$ is the correlation index of the interface a.

8. The method according to claim 1, wherein the indicator is determined by:
determining a set of correlation coefficients, derived from the correlation matrix, for each interface connected to a peer node, said set having the connection coefficients between each interface; and
deriving an average or median value from said set.

9. The method according to claim 1, wherein the number of interfaces selected for relay from an interface is dependent upon a metric derived from a set of correlation coefficients for an interface is determined from $$m*(a) = \sum_{i=0}^{m-1} \theta_i^{(a)}$$

wherein a is the interface, m is the number of interfaces connected to peer nodes, m*(a) is the number of nodes selected for relay interfaces of a node, and θ is the metric that is compared to an indicator, such as the average value ($\overline{c_a}$) of the set of correlation of coefficients of an interface within the set {$c_a$}, wherein $$\theta_i^{(a)} = \begin{cases} 1, & c_{ai} \leq \overline{c_a} \\ 0 & c_{ai} > \overline{c_a} \end{cases}.$$

10. The method according to claim 1, wherein relaying data is further based on at least one of:
(i) a reset time, being the time since node initiation or start-up; and
(ii) a change time, being the time between change events including at least a new peer node connecting to an interface;
a terminated connection to an interface; and
an interface connecting to a node categorised or judged to be malicious.

11. The method according to claim 1, wherein upon node initiation the node connects with peer nodes and relays data via all interfaces for the reset time period, during which the correlation matrix is established, and after said period of time has passed the node relays all data if the correlation between the receiving interface and the other interface is lower than the indicator.

12. The method according to claim 10, wherein upon detecting a change event the correlation matrix is reset and re-determined.

13. The method according to claim 10, wherein upon detecting a change event the node relays all objects from the node via interfaces if the correlation between the receiving interface and the other interface is above the indicator.

14. The method according to claim 10, wherein upon detecting a disconnection of a peer node from an interface the correlation matrix is reset and re-determined.

15. The method according to claim 10, wherein upon detecting a connection between a new peer node with an interface, said interface relays data via all interfaces for:
(i) the reset time; and/or
(ii) the change time.

16. A non-transitory computer readable storage medium comprising non-transitory computer-executable instructions that, when executed, configure a processor to execute operations, the operations comprising:
determining a correlation matrix having correlation coefficients representing a correlation between data processed at each interface of a node of a blockchain network, said node having a plurality of interfaces connected to peer nodes;
receiving data at a receiving interface of said node, wherein the data corresponds to a transaction, determining a correlation index to determine whether the transaction is unique;
selecting one or more other interfaces of said node according to a set of the correlation coefficients of the receiving interface, wherein the selection is based at least in part on a metric derived from the correlation matrix and historical data regarding previous transmissions at the selected interfaces;
dynamically adjusting the correlation matrix and the metric in response to network changes; and
relaying said received data from the selected one or more other interfaces based on the adjusted correlation matrix.

17. An electronic device comprising:
an interface device;
one or more processors coupled to the interface device; and a memory coupled to the one or more processors, the memory storing operations to be executed by the one or more processors, the operation comprising:
- determining a correlation matrix having correlation coefficients representing a correlation between data processed at each interface of a node of a blockchain network, said node having a plurality of interfaces connected to peer nodes;
- receiving data at a receiving interface of said node, wherein the data corresponds to a transaction, determining a correlation index to determine whether the transaction is unique;
- selecting one or more other interfaces of said node according to a set of the correlation coefficients of the receiving interface, wherein the selection is based at least in part on a metric derived from the correlation matrix and historical data regarding previous transmissions at the selected interfaces;
- dynamically adjusting the correlation matrix and the metric in response to network changes; and
- relaying said received data from the selected one or more other interfaces based on the adjusted correlation matrix.

* * * * *